United States Patent [19]
Udipi et al.

[11] Patent Number: 5,130,370
[45] Date of Patent: Jul. 14, 1992

[54] MOLDING COMPOSITIONS OF POLYVINYLBUTYRAL BLEND

[75] Inventors: Kishore Udipi, Longmeadow; Lionel R. Stebbins, Belchertown, both of Mass.

[73] Assignee: Monsanto Company, St. Louis, Mo.

[21] Appl. No.: 795,574

[22] Filed: Nov. 21, 1991

[51] Int. Cl.$^5$ .............................................. C08L 29/14
[52] U.S. Cl. .................................... 525/57; 525/61; 524/443; 524/504; 524/507
[58] Field of Search .................. 525/57, 61; 524/504, 524/507, 443

[56] References Cited

U.S. PATENT DOCUMENTS

| | | | |
|---|---|---|---|
| 4,065,428 | 12/1977 | Deets | 524/504 |
| 4,537,830 | 8/1985 | Hermann et al. | 524/141 |
| 4,552,915 | 11/1985 | Fujita et al. | 524/332 |
| 4,902,464 | 2/1990 | Cartier et al. | 525/61 |

FOREIGN PATENT DOCUMENTS 63-97662 4/1988 Japan.
1-80536 7/1989 Japan.

*Primary Examiner*—Paul R. Michl
*Assistant Examiner*—Tae H. Yoon
*Attorney, Agent, or Firm*—Michael J. Murphy; William J. Farrington

[57] ABSTRACT

A melt blended thermoplastic molding composition consisting essentially of, on a weight basis: (A) 40 to 70 parts plasticized polyvinyl butyral; (B) 60 to 30 parts poly(methylmethacrylate); (C) 0 to 15 parts filler; (D) 0 to 30 parts elastomeric graft polymer; and 0 to 30 parts thermoplastic polyurethane; provided that at least 10 parts of (D) or (E) or mixtures of (D) and (E) is present; and the sum of (A)+(B)+(C)+(D)+(E) is always 100.

6 Claims, No Drawings

MOLDING COMPOSITIONS OF POLYVINYLBUTYRAL BLEND

This invention relates to thermoplastic molding compositions and more particularly to blends of compatible components rich in polyvinyl butyral (PVB) resin.

The principal object of this invention is to provide blends of PVB resin with other compatible polymers, which blends have desirable impact resistance when in molded parts.

These and other objects are accomplished by providing a melt blended thermoplastic molding composition consisting essentially of, on a weight basis:
(A) 40 to 70 parts plasticized polyvinyl butyral;
(B) 60 to 30 parts poly(methyl methyacrylate);
(C) 0 to 15 parts filler, such as calcium metasilicate;
(D) 0 to 30 parts by weight elastomeric graft polymer; and
(E) 0 to 30 parts thermoplastic polyurethane;
provided that at least 10 parts of (D) or (E) or mixtures of (D) and (E) are present; and the sum of (A) +(B) +(C) +(D) +(E) is always 100.

DETAILED DESCRIPTION OF THE INVENTION

Component (A) of the molding compositions of the invention is polyvinyl butyral (PVB) resin which may contain on the vinyl butyral polymer chain minor amounts of units derived from vinyl alcohol and vinyl acetate. Such PVB has a Staudinger molecular weight of about 50,000 to 600,000, preferably 55,000 to 170,000. A representative composition constitutes, on a weight basis, about 11 to 25% hydroxyl groups, calculated as polyvinyl alcohol, 0 to 2.5% acetate groups calculated as polyvinyl acetate, with the balance being vinyl butyral groups. PVB resin is commercially available from Monsanto Company as Butvar ® resin and E. I. duPont de Nemours & Company as Butacite ® resin.

Component (A) also includes one or more plasticizers for the PVB resin in the amount of 15 to 50 preferably 25 to 40 parts by weight per 100 weight parts of the PVB resin. Any plasticizer or mixture of plasticizers known to those skilled in the art for use with PVB resin can be used. Such plasticizers are disclosed in U.S. Pat. No. 4,902,464, col. 5, lines 11-21, the content of which is incorporated herein by reference. Dihexyl adipate is a preferred plasticizer.

Plasticized PVB is used in large quantities, particularly as interlayer in laminated safety glass for window applications in buildings and vehicles. Plasticized PVB recovered as scrap can be recycled and optionally used as component (A) in the molding compositions of the invention. Such scrap also can be excess sheet trimmed from the edge of a laminate during its preparation or recovered from used laminated glass panels. In the latter instance, the discarded laminated safety glass (for example, windshields of junked vehicles) is crushed to separate the plasticized PVB sheet from the glass which is separately recycled. The remaining plasticized PVB sheet contains trace (on the order of about 5 weight percent) amounts of glass and/or other adjuvants or contaminants associated with the laminating process adhered to its surface. Such glass, adjuvants or contaminants, depending on the molding application, need not be removed and can constitute a minor constituent of component (A) present for convenience and not materially affecting the properties of the molding composition. Scrap sheet such as removed from laminated panels may be clear (i.e., uncolored) or entirely or partially colored from the presence in the sheet or dye(s) or pigment(s).

Component (B) of the molding compositions comprises homopolymers of methyl methacrylate and/or copolymers of methyl methacrylate with $C_1$-$C_4$ alkyl acrylate or methacrylate containing in the copolymer at least 80 parts by weight polymerized methyl methacrylate. Preferred polymers are homopolymer methyl methacrylate (PMMA) and the copolymer of methyl methacrylate and butyl acrylate (80:20 parts by weight). Commercially available polymers usable as component (B) include Plexiglas VM and V-811 from Rohm and Haas Inc. (PMMA).

PMMA is also commercially used in large quantities, particularly as window glazing. Such PMMA recovered as scrap and recycled can also optionally be used as part or all of component (B) in the molding compositions of the invention.

A used scrap laminate containing both plasticized PVB and PMMA can be advantageously used to provide both components (A) and (B) of the molding compositions.

Component (C) of the molding compositions comprises inorganic filler. Various commercial grades of fillers are available and usable. Powdered calcium metasilicate is preferred and is available from NYCO of Willsboro, N.Y. as Wollastokup. Other usable inorganic inert fillers include various hard and soft clays, calcium carbonate, barium sulfate, titanium dioxide, hydrated alumina, such as aluminun trihydrate-amino silane or stearate and the like.

Elastomeric graft polymers usable as component (D) in molding compositions of the invention comprise polymers preferably of the same monomers composition as in component (B) i.e. homopolymer methyl methacrylate or copolymers of methyl methacrylate with $C_1$ to $C_4$ alkyl acrylate containing at least 80 weight percent methyl methacrylate, grafted onto elastomers selected from the group consisting of diene monomer rubbers, alkyl acrylate rubbers and EPDM rubbers. Preferred elastomeric graft polymers are those in which the graft polymer is 100% by weight methyl methacrylate grafted onto one of the previously mentioned elastomers.

Other suitable elastomeric grafting bases include conjugated diene rubbers such as polybutadiene, butadiene/styrene copolymers with up to 30% by weight of styrene, butadiene/acrylonitrile copolymers with up to 20% by weight of a lower alkyl ester of acrylic or methacrylic acid, for example methyl acrylate, ethyl acrylate, or ethyl methacrylate. Other suitable elastomers or rubbers are polyisoprene or polychloroprene. Alkyl acrylate rubbers based on $C_1$-$C_8$-alkyl esters of acrylic acid, for example ethyl, butyl and/or ethylhexyl acrylate, are also suitable. Such alkyl acrylate rubbers can optionally contain up to 30% by weight of copolymerized monomers such as vinyl acetate, acrylonitrile, styrene, methyl methacrylate or vinyl ether. Such alkyl acrylate rubbers can also contain smaller quantities, for example up to 5% by weight, of ethylenically unsaturated monomers having a crosslinking function. Examples of such crosslinking agents are alkylenediol di(meth) acrylates, polyester di(meth) acrylates, divinylbenzene and trivinylbenzene, triallyl cyanurate and allyl (meth) acrylate. Preferred rubbers are diene monomer rubbers or alkyl acrylate rubbers.

The graft polymers defined as component (D) consist of 5 to 80% by weight, in particular 20 to 70% by weight, of rubber and 95 to 20% by weight, in particular 80 to 30% by weight, of grafted monomers. Such graft polymers are prepared by known free-radical graft copolymerization of the above mentioned monomers in the presence of the rubbers to be grafted. Preferred grafting processes are graft polymerization in emulsion, solution, bulk or suspension.

The product of the grafting process forming component (D) contains the rubber grafted with the polymerized monomer as well as ungrafted polymerized monomers. The true content of the grafted rubber and simultaneously formed ungrafted polymerized monomers can be determined by known parameters such as degree of grafting or grafting yield. Such grafting yields can vary within wide ranges with the conditions of graft polymerization.

Component (E) of the molding compositions of the invention is thermoplastic polyurethane (TPU). Functional TPU's contain hard and soft segments formed respectively of polymerized diisocyanate and polyol components. The ratio or weight % of hard to soft segments determines the physical properties of the TPU. In synthesizing TPU a difunctional chain extender such as a diol or diamine is used to space diisocyanate molecules in the polymer chains. A prepolymer of diisocyanate and difunctional chain extender is preferably first prepared to avoid toxicity problems associated with handling monomeric isocyanate.

The diisocyanate can be saturated aliphatic, either linear or cycloaliphatic (including mixtures of same) or aromatic (including mixtures of same) or mixtures of aliphatic and aromatic diisocyanates. Cycloaliphatic diisocyanates are preferred and comprise cyclohexyl diisocyanates having one or two cyclohexyl ring groups. Methylene bis (4-cyclohexyl) diisocyanate is most preferred.

The polyol component of the TPU is a polyether polyol or a mixture or polyether polyol(s) and polyester polyol(s), such as linear long chain polyether or polyester diols, the molecular weight of which determines the hardness of the TPU and its compatibility in a polyblend with PVB. Preferred polyols are polyether polyols such as polytetraalkylene ether glycols where alkylene is $C_1$–$C_4$.

The molding compositions of the invention are prepared by melt blending the components in conventional equipment such as an extruder, Banbury mixer, mill roll or the like, at temperatures sufficient to achieve a homogeneous melt (about 200°–250° C.) after which the blend may be pelletized and stored before shaping (e.g., by molding) into finished parts.

Additional optional components may be included in the compositions of the invention depending on the intended use, such as, for example, pigments, flame retardant additives and the like. It may be necessary to incorporate stabilizers and antioxidants to prevent degradation of the rubber graft polymers.

The following examples are intended to illustrate more fully the nature of the invention without acting as a limitation on its scope. Percentages and parts given are on a weight basis.

The following tests were conducted on specimens prepared according to the Examples:

1. Notched izod impact ASTM D-256-70; room temperature sample bar cross section of 3.2 mm × 12.5 mm.

Notched Izod Impact Classification Rating (Room temperature) on which performance is based is:

| | |
|---|---|
| Low | 0.1–1.5 ft. lbs./in. (0.053–0.795 J/cm) |
| Medium | 1.51–4.0 ft. lbs./in. (0.80–2.1 J/cm) |
| High | 4.1–9.0 ft. lbs./in. (2.2–4.77 J/cm) |
| Super Tough | 9.1–20+ ft. lbs./in. (4.8–10.6+ J/cm) |

2. Inverted Dart Impact (IDI)—a multiaxial, high speed, impact test. The test specimen was 2"×2"×0.075" (5 cm×5 cm×0.2 cm) prepared by injection or compression molding. Specimens were temperature and relative humidity conditioned for 24 hours prior to testing. The IDI machine used a moving specimen clamp which is driven over a fixed dart attached to a load measuring cell. The load cell output is processed by computer which integrates the impact energy and outputs the result at failure. Specimen temperature was 20° C. and impact speed was 8000 in./min. (203.2 m/min.). Ten specimens constitute a set representative of a formulation with the result reported being the average for the set.

IDI Classification Rating (20° C.) on which performance is based is:

| | |
|---|---|
| Low | 0–100 in-lbs. (0–11.2 J) |
| Medium | 101–200 in-lbs. (11.3–22.4 J) |
| High | 201–300 in-lbs. (22.5–33.7 J) |
| Super Tough | 301–500 in-lbs. (33.8–56.2 J) |

EXAMPLES 1–15

Examples 1, 3, 7, 8, 9, 10, 12, 13 and 15 are according to the invention. Examples 2, 4, 5, 6, 11 and 14 are not inventive and are controls.

Off-grade plasticized PVB sheet containing 32 phr dihexyl adipate plasticizer was shredded into about 1 in. (2.54cm) square pieces, nominally 30 mil. (0.76 mm) thick. Remaining formulation components are identified in the Table following. The various formulations were melt blended in a screw extruder, pelletized and test specimens then injection molded from the pellets. Results were as follows (numbers are percentages):

| | Example | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Component (Weight %) | | | | | | | | | | | | | | | |
| Scrap Plasticized PVB | 54 | 36 | 48 | 60 | 40 | 50 | 51 | 54 | 51 | 40 | 30 | 45 | 65 | 35 | 54 |
| PMMA[1] | 36 | 54 | 32 | 40 | 60 | 50 | 34 | 36 | 34 | 40 | 30 | 30 | 25 | 15 | 36 |
| Rubber Graft Polymer | | | | | | | | | | | | | | | |
| Acryloid 330[2] | 10 | 10 | 20 | | | | | | 15 | | | | | | |
| Paraloid 3339[3] | | | | | | | | | | 20 | 20 | | | | |
| BTA 733[4] | | | | | | | 15 | 10 | | | | 12.5 | | | |
| DIN 611[5] | | | | | | | | | | | | 12.5 | | | |
| SGL 40UX[6] | | | | | | | | | | | | | | | |
| Thermoplastic Polyurethane: | | | | | | | | | | | | | | | |

-continued

| | Example | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Tecoflex EG-85A[7] | | | | | | | | | | | | | | | 10 |
| Filler | | | | | | | | | | | | | | | |
| Wollastokup 10734[8] | | | | | | | | | | | 20 | | 10 | 50 | |
| Properties: | | | | | | | | | | | | | | | |
| Izod Impact (ft. lbs./in.) | 4 | 0.6 | 17.2 | 0.7 | 0.3 | — | 10.1 | 2.6 | — | 10.5 | 0.6 | 1.5 | 1 | — | 1.8 |
| IDI Impact (in.-lbs.) | — | — | — | — | — | 3.7 | 226 | 252 | 200 | 300 | 29 | 270 | 285 | 3.3 | 295 |

[1] Plexiglas VM - Rohm and Haas, Inc. - Homopolymer polymethyl methacrylate
[2] Acryloid KM 330 - Rohm and Haas, Inc. - Butyl acrylate rubber core grafted with methyl methacrylate
[3] Paraloid 3339 - Rohm and Haas, Inc. - Butyl acrylate rubber core grafted with methyl methacrylate
[4] BTA 733 - Rohm and Haas, Inc. - Butadiene-styrene-methyl methacrylate graft copolymer
[5] DIN-611 - Monsanto Chemical Company - Polybutadiene grafted with styrene-acrylonitrile copolymer
[6] SGL-40UX - Monsanto Chemical Company - Butadiene-acrylonitrile rubber grafted with styrene-acrylonitrile copolymer
[7] Tecoflex EG-85A - Thermedics, Inc., Woburn, Mass. - Reaction product of methylene bis(cyclohexyl diisocyanate, poly(tetramethylene ether glycol) (MW = 2000) and 1,4 butanediol chain extender.
[8] Wollastokup 10734 - NYCO, Wellsboro, NY - Calcium metasilicate The above results show that plasticized PVB modified only with PMMA (control Exs. 4, 5, and 6) tends to be quite brittle. Similarly (control Exs. 11, 14) at only 30–35% plasticized PVB, impact resistence is too low. When elastomeric graft polymer or thermoplastic polyurethane is present (Examples 1, 3, 7, 8, 9, 10, 15) impact properties are greatly increased.

The preceding description is set forth for purposes of illustration only and is not to be taken in a limited sense. Various modifications and alterations will be readily suggested to persons skilled in the art. It is intended, therefore, that the foregoing be considered as exemplary only and that the scope of the invention be ascertained from the following claims.

We claim:

1. A melt blended thermoplastic molding composition consisting essentially of, on a weight basis:
    (A) 40 to 70 parts plasticized polyvinyl butyral;
    (B) 60 to 30 parts poly(methylmethacrylate);
    (C) 0 to 15 parts filler;
    (D) 0 to 30 parts elastomeric graft polymer; and
    (E) 0 to 30 parts of thermoplastic polyurethane;
    provided that at least 10 parts of (D) or (E) or mixtures of (D) and (E) are present; and
    the sum of (A)+(B)+(C)+(D)+(E) is always 100.

2. The composition of claim 1 wherein the elastomer of the elastomeric graft polymer is selected from butadiene, butadiene styrene copolymer, $C_1$–$C_4$ acrylate and mixtures thereof.

3. The composition of claim 1 containing 5 to 15% filler.

4. The composition of claim 2 wherein the elastomeric graft polymer comprises butyl acrylate grafted with poly(methyl methacrylate).

5. The composition of any of claims 1, 2, 3, or 4 containing 10 to 50 parts by weight plasticizer per 100 parts by weight polyvinyl butyral.

6. The composition of claim 5 wherein the filler comprises calcium metasilicate.

* * * * *